United States Patent [19]

Busch

[11] 4,004,646
[45] Jan. 25, 1977

[54] WEIGHING SYSTEM

[76] Inventor: Albert E. Busch, 2400 Barbara St., Bloomington, Ind. 47401

[22] Filed: Nov. 20, 1975

[21] Appl. No.: 633,634

[52] U.S. Cl. .................................. 177/1; 177/212; 324/181
[51] Int. Cl.² ..................... G01G 7/02; G01G 23/37
[58] Field of Search ..................... 177/210, 212, 1; 324/181

[56] References Cited
UNITED STATES PATENTS

| | | | |
|---|---|---|---|
| 2,081,367 | 5/1937 | Nicolson | 177/210 |
| 3,390,733 | 7/1968 | Takahashi | 177/212 |

*Primary Examiner*—Joseph W. Hartary
*Attorney, Agent, or Firm*—Frank E. Mauritz

[57] ABSTRACT

A weighing table is physically connected to the core of a solenoid. The time required for the current flow to build up to a value sufficient to move the core and raise the weight on the table is measured and serves as a measure of such weight. The solenoid is periodically energized through a constant voltage source and correspondingly an associated counter circuit is energized to initiate a time count and when the solenoid is de-energized the counter circuit is reset to zero. The time indicated by the counter circuit is a measure of the weight.

7 Claims, 2 Drawing Figures

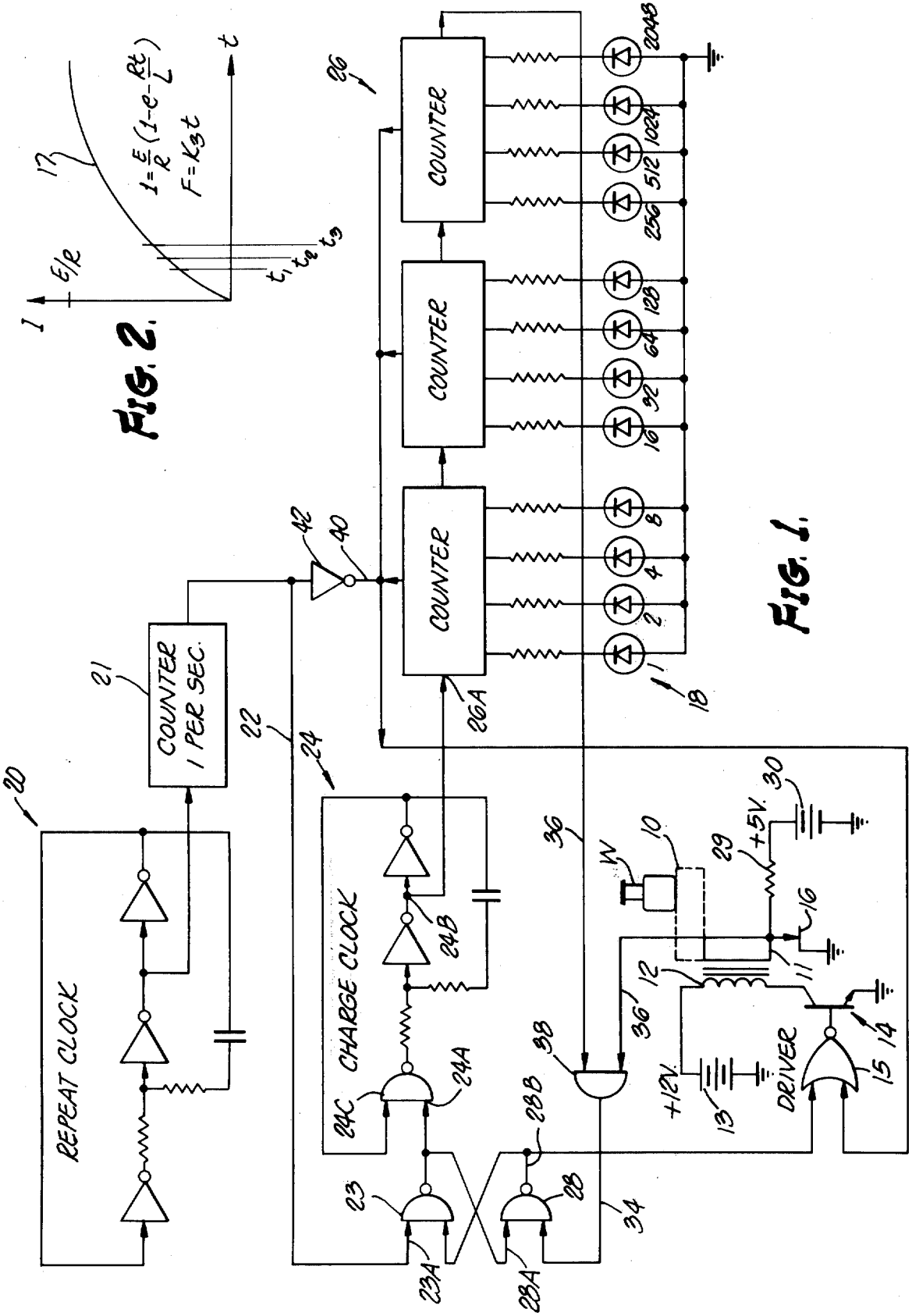

WEIGHING SYSTEM

The present invention relates to an improved weighing system.

An object of the present invention is to provide an improved weighing system which functions to indicate weight in terms of time.

Another object of the present invention is to provide an improved system which is accurate in its weight determinations and is relatively simple and inexpensive.

A specific object of the present invention is to provide an improved weighing system that operates on the principle that a solenoid coil when subjected to a constant voltage admits increasing current flow and that a particular weight requires a corresponding particular magnitude of solenoid current to lift such weight with the time required for current build-up from zero to such particular magnitude being a measure of that weight.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 illustrates a weighing system embodying features of the present invention.

FIG. 2 illustrates the rise of current in a graph in which time is the abscissae and current is the ordinates.

The system is calibrated to indicate a particular weight in a range of, for example, a zero to ten pounds.

The weight W to be weighed is placed on a weigh table 10 which is physically connected to and is thus movable with the solenoid core 11 having the associated solenoid coil 12.

Solenoid 12 has one of its terminals connected to a constant voltage source 13 which is maintained at a constant magnitude of, for example, twelve volts, the other terminal of coil 12 being returned to ground through a switching device 14 that has its base electrode connected to the output terminal of driver 15 connected as a NOR gate.

When the device 14 is rendered conductive as explained later the current flow through coil 12 begins from a zero level value as indicated by the graph 17 in FIG. 2 and increases in value sufficient to move its core 11 and raise the weigh table. Initial movement of such weigh table 10 is sensed by the normally closed switch which then opens for purposes of terminating operation of a time counter 18 (calibrated in terms of weight) as explained in more detail later. In general, operation of the counter 18 is initiated when the coil 12 is initially energized, i.e., when switching device 14 is closed and the count in counter 18 is terminated when the switch 16 opens. Switch 16 has its ungrounded terminal physically connected to core 11 and moves therewith.

Weighing (measurement of time) is cyclically repeated at the rate of approximately one measurement per second. For this latter purpose the system incorporates a repeat clock 20 delivering its output to a counter 21 which produces a start pulse on its output lead 22 once per second. Such output start pulse is applied to the input terminal 24A of the NAND gate 24C of the chargeclock system 24 which has its output terminal connected to the input terminal 26A of the counter 26 such that development of the start pulse on lead 22 causes operation of counter 26 to initiate a time count therein during that time when switch 16 remains closed.

The NAND gates 23, 28 are interconnected as a flip-flop.

The output of switching device 23 is applied also to an input terminal 28A of switching device 28 having its output terminal 28B connected to an input terminal of driver 15 which causes the switching device 14 to close and thereby initiate a current flow through coil 12. Such current builds up in value during a finite time required for the initial movement of core 11 and raising of table 10 at which time the switch 16 opens and develops a stop pulse on lead 34 which is connected to one terminal of device 28. For developing such stop pulse the ungrounded movable terminal of switch 16 is connected through resistor 29 to the ungrounded terminal of a five volt source 30. Opening of switch 16 results in a raising of voltage on lead 36 which is connected to AND gate 38 that then functions to produce the stop pulse on lead 34 and to produce a pulse on lead 36 to thereby terminate the count in counter 26.

Subsequently the counter 26 is reset to zero and also the driver 15 is conditioned to open the switching device 14 upon development of a reset pulse in counter 21 which is applied to reset lead 40 via inverter 42.

Thus the counter circuit 26 is repeatedly rendered effective to measure the time required to cyclically raise the weigh table 10 and such time so indicated is a measure of the weight on table 10.

It will be appreciated that other electrical circuitry than that specifically shown and described herein may be used to produce measurements based on the time required for build-up in solenoid current to a finite value to lift a weight of corresponding value.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. A method of weighing in which a weighing platform is connected to a relatively movable element of electromagnet means, the steps including, initiating a current flow through said electromagnetic means, and measuring the time required for the current to build up to a sufficiently high value to produce movement of said platform.

2. The method set forth in claim 1 in which said current is recurrently applied and correspondingly measurements of said time are made.

3. In a weighing system, a weighing platform receptive to a weight; electromagnetic means comprising two relatively movable elements, one of which is movable upon supplying current to the other element; means connecting said one element to said platform; means for supplying current to the other one of said elements to move said one element; and means effective when current is supplied to said other element for measuring a characteristic of said current to said other element.

4. In a weighing system, a weighing platform receptive to a weight; electromagnetic means comprising two relatively movable elements, one of which is movable upon supplying current to the other element; means connecting said one element to said platform; means for supplying current to the other one of said elements to move said one element; and means effective when current is supplied to said other element for measuring the time required for the current to said other element to build-up to a sufficient magnitude to produce movement of said one element.

5. A weighing system as set forth in claim 4 including switching means operated upon movement of said one element to terminate further current flow to said other element.

6. A weighing system as set forth in claim 4 including a counter rendered effective upon application of current to said other element; and switching means operated upon movement of said one element for terminating the count in said counter.

7. A weighing system as set forth in claim 4 including means responsive to movement of said platform for recurrently supplying and current to said other element, and time counter means responsive to movement of said platform for correspondingly recurrently measuring the time required for said current build-up.

* * * * *